(12) United States Patent
Cho (10) Patent No.: US 6,681,333 B1
(45) Date of Patent: Jan. 20, 2004

(54) PORTABLE COMPUTER USING A STYLUS FOR POWER CONTROL

(75) Inventor: Young-Tack Cho, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/544,207

(22) Filed: Apr. 7, 2000

(30) Foreign Application Priority Data

May 20, 1999 (KR) .......................................... 1999-18307

(51) Int. Cl.⁷ ................................................ G06F 1/26
(52) U.S. Cl. ........................ 713/300; 713/310; 345/179; 70/63
(58) Field of Search ................................ 713/300, 310, 713/320, 323; 345/173, 179; 455/90, 556, 574, 575; 361/683, 686; 70/63; 178/19.01, 19.05

(56) References Cited

U.S. PATENT DOCUMENTS

| 5,067,573 | A | * | 11/1991 | Uchida | 345/173 |
| 5,483,262 | A | * | 1/1996 | Izutani | 345/179 |
| 5,635,959 | A | * | 6/1997 | Takeuchi et al. | 345/179 |
| 5,898,427 | A | * | 4/1999 | Okamoto | 345/179 |
| 6,114,958 | A | * | 9/2000 | Murphy | 340/568.1 |
| 6,233,464 | B1 | * | 5/2001 | Chmaytelli | 455/556 |
| 6,392,639 | B1 | * | 5/2002 | Lee et al. | 345/179 |
| 6,473,076 | B1 | * | 10/2002 | Thompson et al. | 345/179 |

FOREIGN PATENT DOCUMENTS

| JP | 06138997 A | * | 5/1994 | G06F/3/03 |
| JP | 08129532 A | * | 5/1996 | G06F/15/02 |
| JP | 09330169 A | * | 12/1997 | G06F/3/03 |
| JP | 10143292 A | * | 5/1998 | G06F/1/26 |
| JP | 11066011 A | * | 3/1999 | G06F/15/02 |

OTHER PUBLICATIONS

Michael J. Stango—"Palmtree Products Newton Glove 2000" —Dec. 31, 1997—Newsgroups: comp.sys.newton.misc.*

* cited by examiner

Primary Examiner—Thomas Lee
Assistant Examiner—Thuan Du
(74) Attorney, Agent, or Firm—Robert E. Bushnell, Esq.

(57) ABSTRACT

A portable computer using a stylus for power control comprises a main body of the computer contained in a housing and provided with a stylus-holding means, a stylus for inputting data, and a means for detecting the combination and separation of the stylus and for controlling power supply to a system unit. The detecting and controlling means consists of a signal-generating unit and a power control unit. The signal-generating unit is positioned in the main body so as to detect the combination and separation of the stylus and generate a signal. The power control unit controls power supply to the system unit in response to the signal.

21 Claims, 10 Drawing Sheets

PORTABLE COMPUTER USING A STYLUS FOR POWER CONTROL

CLAIM OF PRIORITY

This application makes reference to, incorporates the same herein, and claims all benefits accruing under 35 U.S.C. §119 from the inventor's application PORTABLE COMPUTER WITH FUNCTION OF POWER CONTROL BY COMBINATION OR SEPARATION OF STYLUS filed with the Korean Industrial Property Office on May 20, 1999 and there duly assigned Ser. No. 18307/1999.

BACKGROUND OF THE INVENTION

1. Field of the Invention

The present invention relates, in general, to portable computers and, more particularly, to a portable computer whose power supply is controlled by the combination and separation of a stylus.

2. Description of the Related Art

As computer technology has developed, portable computers such as wallet personal computers, Personal Digital Assistants (PDAs) and Handheld Personal Computers (HPCs) are increasingly used. Often, in order to reduce the thickness and weight of computers, they are made without any keyboard. Instead, data is input into the computer by manipulating a stylus on a screen. Such a stylus is referred to as a pen or a pen stylus.

Such a portable computer typically includes: a main body of the computer; a display, such as a Liquid Crystal Display (LCD), having a Touch Screen Panel (TSP) for inputting and outputting data on a screen; a stylus for inputting the data; a stylus-holding means formed in the housing of the main body, for holding the stylus; and a power switch located in the main body.

In such a portable computer, when the computer enters a low power mode (in which power is not supplied to the chief electronic elements of the computer), no need exists for using the stylus (it is used only for data input). At such times, a user may forget to put the stylus into the stylus-holding means, and therefore the stylus may get lost.

SUMMARY OF THE INVENTION

Accordingly, an object of the present invention is to provide a portable computer that prevents a stylus from being lost, protects a display from being damaged, and eliminates inconvenience in operating the computer.

To accomplish the above objects, among others, the present invention provides a portable computer, comprising a main body of the computer contained in a housing and provided with a stylus-holding means, a stylus for inputting data, and means for detecting the combination and separation of the stylus and for responsively controlling power supply to a system unit.

In accordance with an embodiment of the invention, the detecting and controlling means consists of a signal-generating unit for detecting the combination and separation of the stylus and for generating a signal, the signal-generating unit being positioned in the main body of the computer, and a power control unit for controlling a power supply to the system unit in response to the signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DESCRIPTION OF THE PREFERRED EMBODIMENTS

Figure 1:
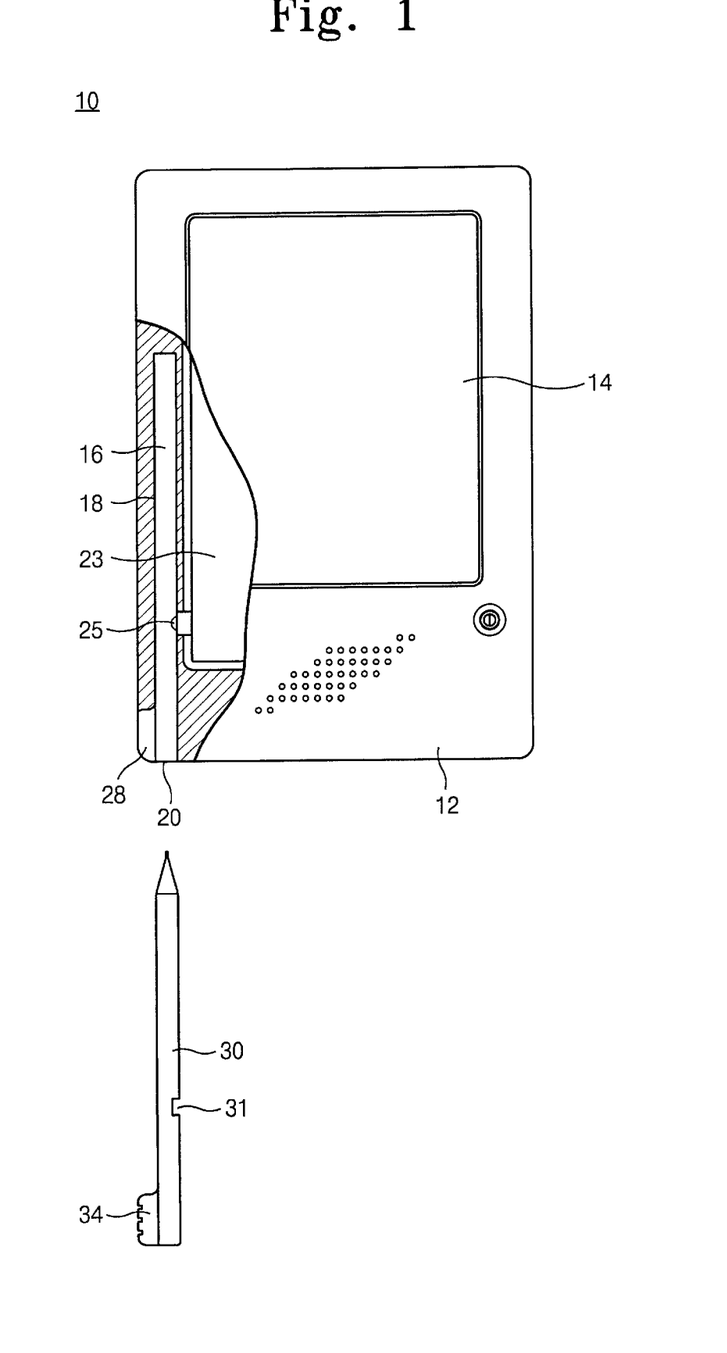
FIG. 1 is a plan view of a portable computer showing a stylus to be put into a stylus-holding means of the portable computer in a first embodiment of the invention.

Referring to FIG. 1, a plan view showing stylus being inserted into a stylus-holding means of a portable computer of a first embodiment of the present invention, it is seen that a portable computer 10 includes a main body 12, a display 14, and a stylus 30. (Other electronic components of the portable computer and a power unit are located in main body 12 although they are not illustrated in the drawings.) Display 14 is operated while being connected to the electronic units and the power unit. Commands are input into the computer by manipulating stylus 30 on display 14. Therefore, display 14 is adapted to receive the commands by the manipulation of stylus 30.

In order to input commands into the computer 10, various technologies are employed. One such technology uses a conductive stylus to input the commands. The conductive stylus is connected to the portable computer 10 via a cord (not shown). The cord has an internal conductor that connects the stylus with the portable computer 10 so as to allow the write function to be performed on display 14.

Figure 2:
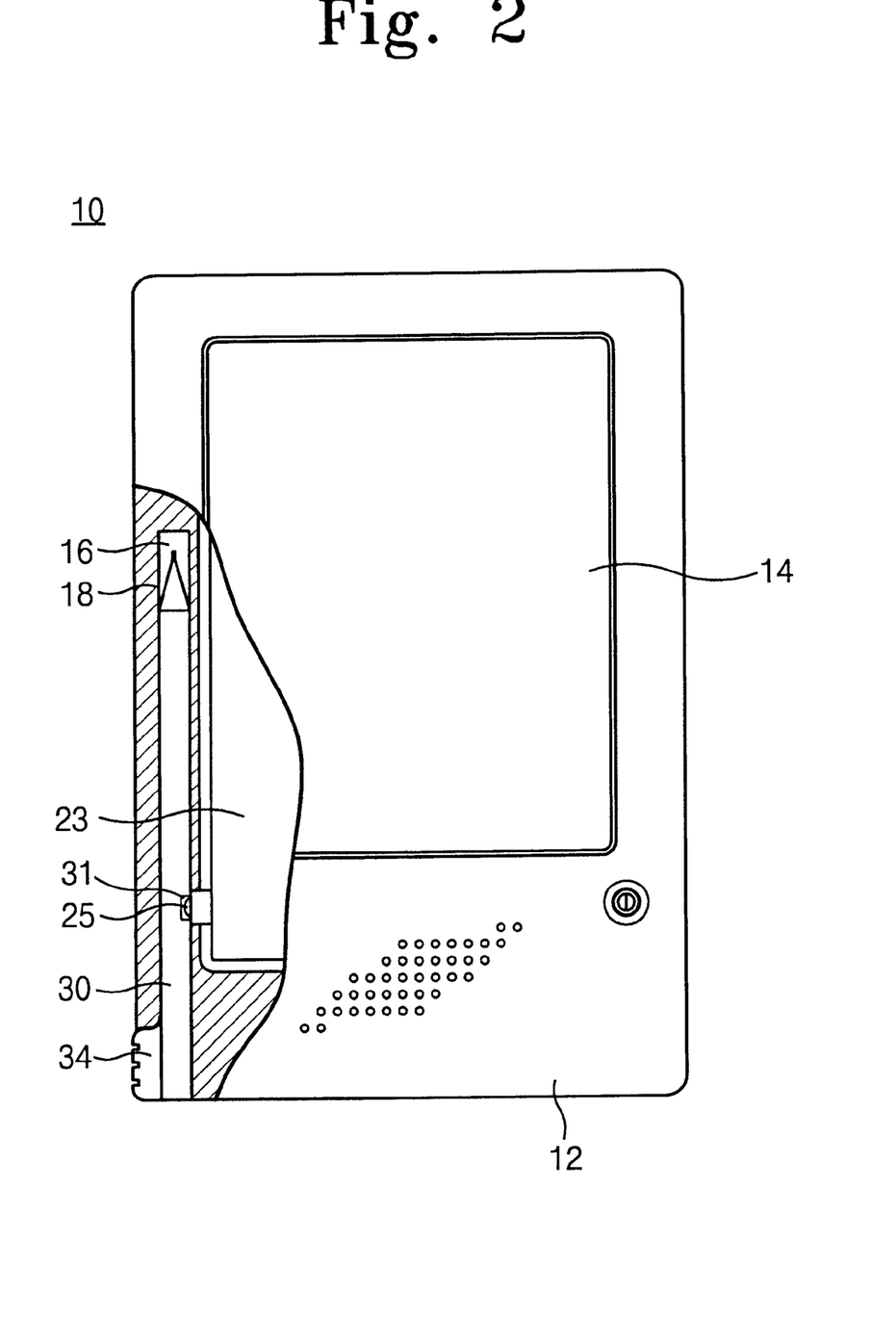
FIG. 2 is a plan view of the same portable computer, showing a stylus inserted into the stylus-holding means of the portable computer in the first embodiment.

Touch-screen technology may also be used. In a touch-screen embodiment, a stylus-holding hole 16 is formed in main body 12 of portable computer. The stylus-holding hole 16 holds stylus 30 therein. The stylus-holding hole 16 has an opening 20 at its outer end. In order to allow the stylus 30 to be held in the stylus-holding hole 16, stylus 30 is inserted into stylus-holding hole 16 through opening 20. A slot 28 is formed to be so connected to the stylus-holding hole 16 as to engage with a flange 34 of the stylus 30 when stylus 30 is put into the stylus-holding hole 16. Slot 28 extends from an outer end portion of the stylus-holding hole 16 to one side end of the main body 12. The shape of slot 28 is complementary to that of flange 34 of stylus 30. A push button switch 25 for sensing the insertion of the stylus 30 into the main body 12 and the extraction of the stylus 30 therefrom is mounted on a printed circuit board 23. A portion of the push button switch 25 projects toward the central axis of stylus-holding hole 16. Also, the stylus 30 is provided with a recess 31. When the stylus 30 is put into stylus-holding hole 16, the projecting portion of push button switch 25 is pushed by the external surface of the stylus 30 until the projecting portion of the push button switch enters recess 31 as seen in FIG. 2. When the push button switch 25 is pushed, it generates a signal.

Figure 3:
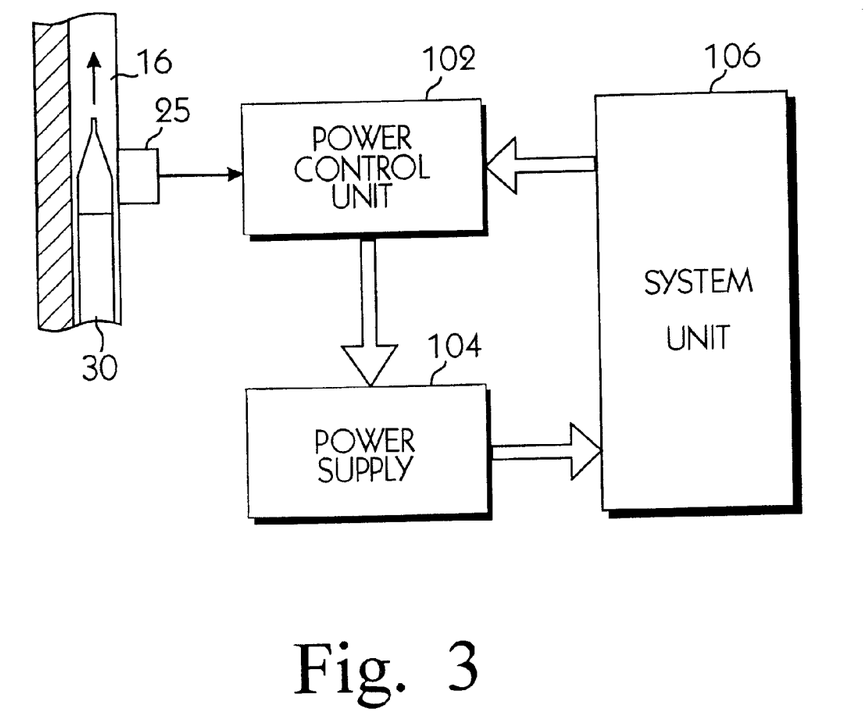
FIG. 3 is a block diagram showing signal flow in accordance with the combination and separation of the stylus in the first embodiment.

Referring now to FIG. 3, a power control unit 102 receives the signal from the switch 25 of FIGS. 1 and 2 and stops power supply to a system unit 106. Consequently, the power mode of the portable computer 10 goes from ON to LOW POWER mode (or STANDBY MODE), or if preferred an OFF mode in which power is completely off. When the stylus 30 is fully inserted into stylus-holding hole 16, power is restored.

The push button switch 25 may be replaced with a different sensor, such as a photo sensor or need switch. When push button switch 25 is pushed physically, or the photo sensor senses the insertion of stylus 30, push button switch 25, or the photo sensor, generates a signal and transmits the signal to power control unit 102. When power control unit 102 receives the signal, the power control unit 102 controls power supply 104 to stop power supply to system unit 106. A signal representative of the current operating state of system unit 106 is sent to the power control unit 102 every predetermined period.

By the same token, when stylus 30 is taken out of stylus-holding hole 16, the push button switch 25 generates a signal and transmits the signal to power control unit 102. When power control unit 102 receives the signal, power control unit 102 controls power supply 104 to supply power to the system unit 106.

Hence, in accordance with the present invention, the stylus 30 can perform the function of a power switch instead of a power switch. Thus, when stylus 30 is inserted into main body 12 of the computer 10, power supply to system unit 106 is turned off and the computer 10 goes into STANDBY mode. On the other hand, when stylus 30 is extracted from main body 12 of the computer 10, power supply to system unit 106 is effected, and the computer 10 goes into ON mode.

Figure 4:
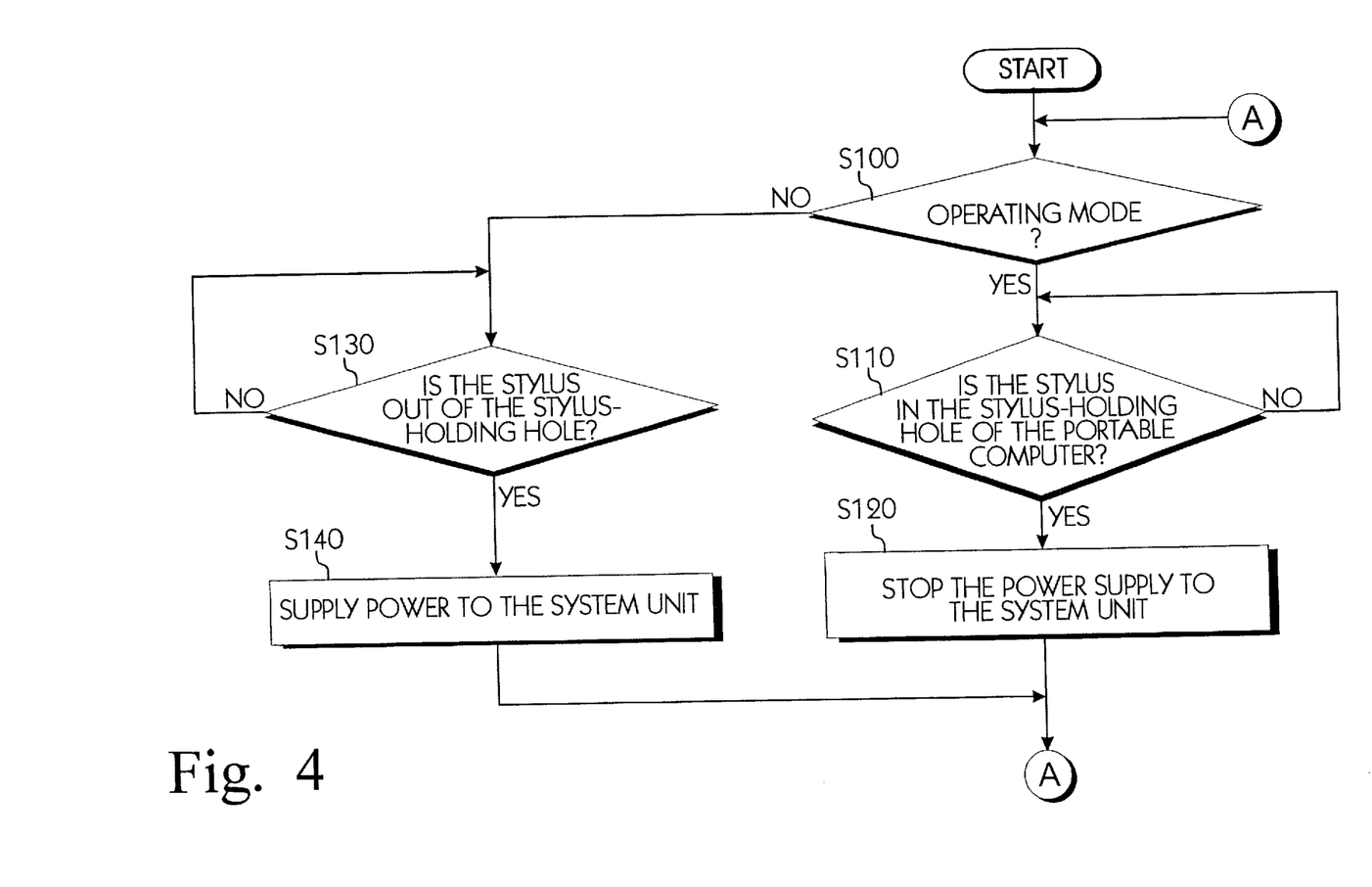
FIG. 4 is a flowchart showing the operation of the portable computer of the present invention in accordance with the combination and separation of the stylus.

Referring now to FIG. 4, if stylus 30 is in stylus-holding hole 16 of portable computer 10 (step S110) while portable computer 10 is in ON mode (step S100), power supply to system unit 106 stops (S120). Hence, the portable computer 10 goes into STANDBY mode or OFF mode. On the other hand, if stylus 30 is out of stylus-holding hole 16 (S130) while portable computer 10 is in a STANDBY or LOW POWER mode (S100), or is in OFF mode, power control unit 102 allows power supply 104 to supply power to system unit 106 (S140). Hence, the portable computer 10 goes to ON or operating mode. The "A" of the flowchart of FIG. 4 may be either a low power (STANDBY) mode or an operating (ON) mode. The mode of the portable computer 10 may be converted from one of the two modes to the other mode continually by use of the stylus 30.

Figure 5:
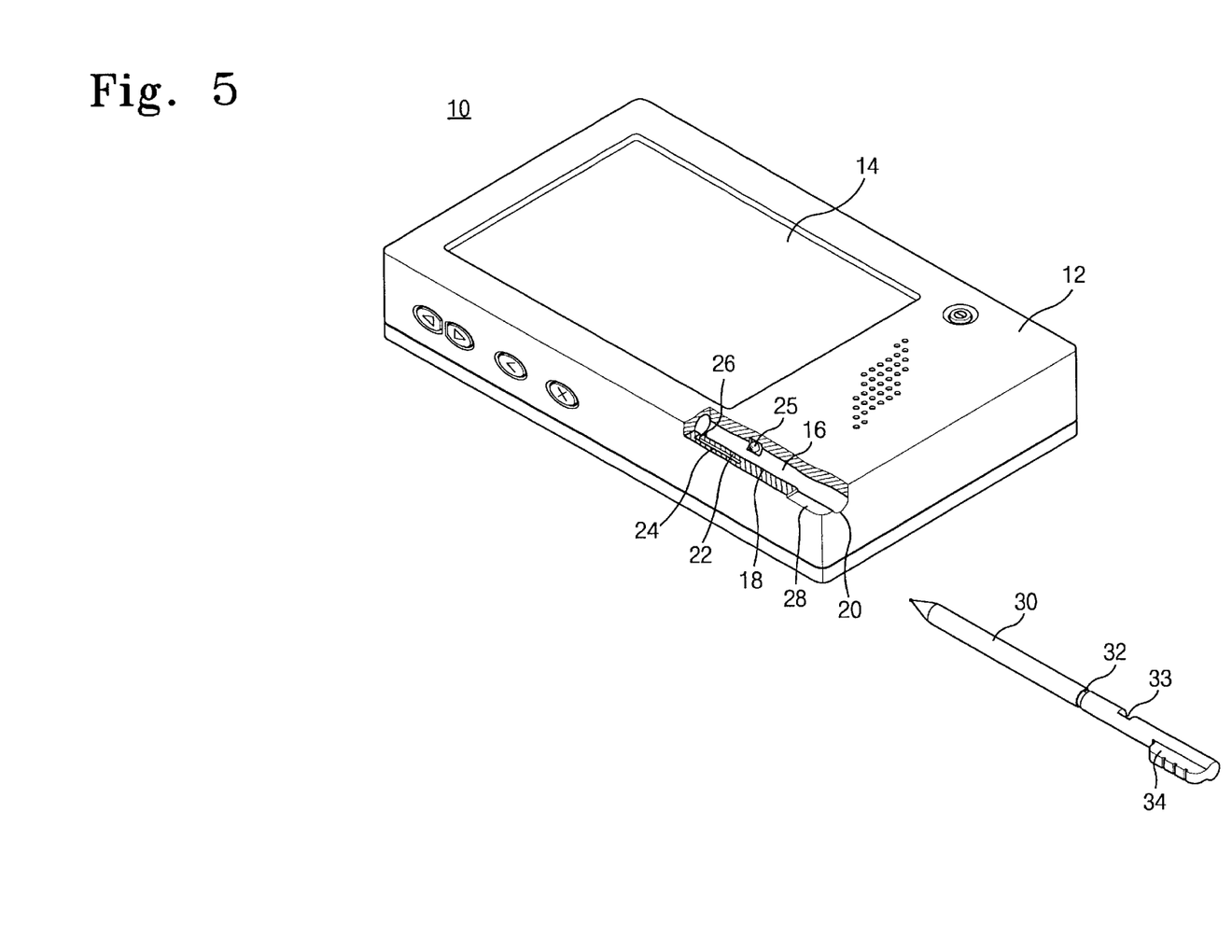
FIG. 5 is a partially cutaway perspective view showing a stylus taken out of a stylus-holding means of a portable computer in a second embodiment of the present invention.
Figure 6:
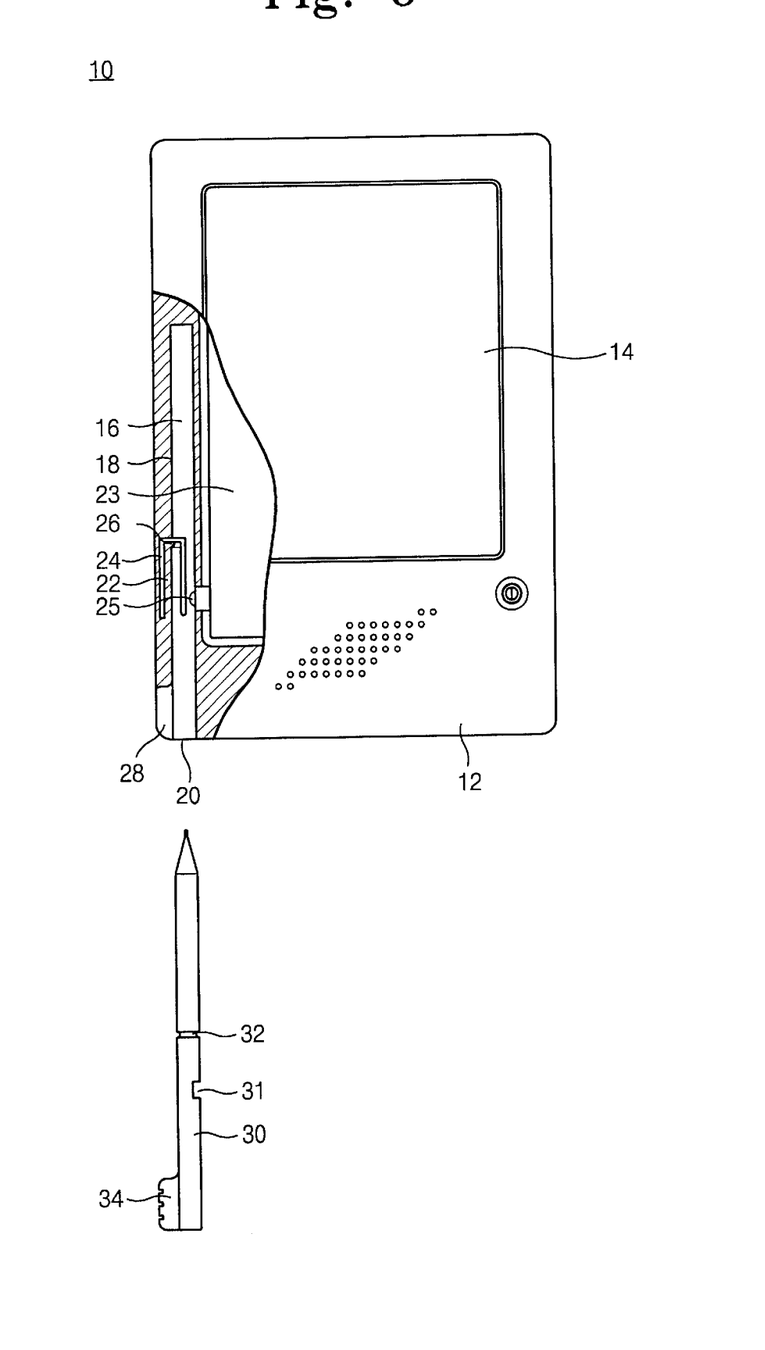
FIG. 6 is a partially cutaway plan view showing a stylus taken out of a stylus-holding means of a portable computer in the second embodiment.
Figure 7:
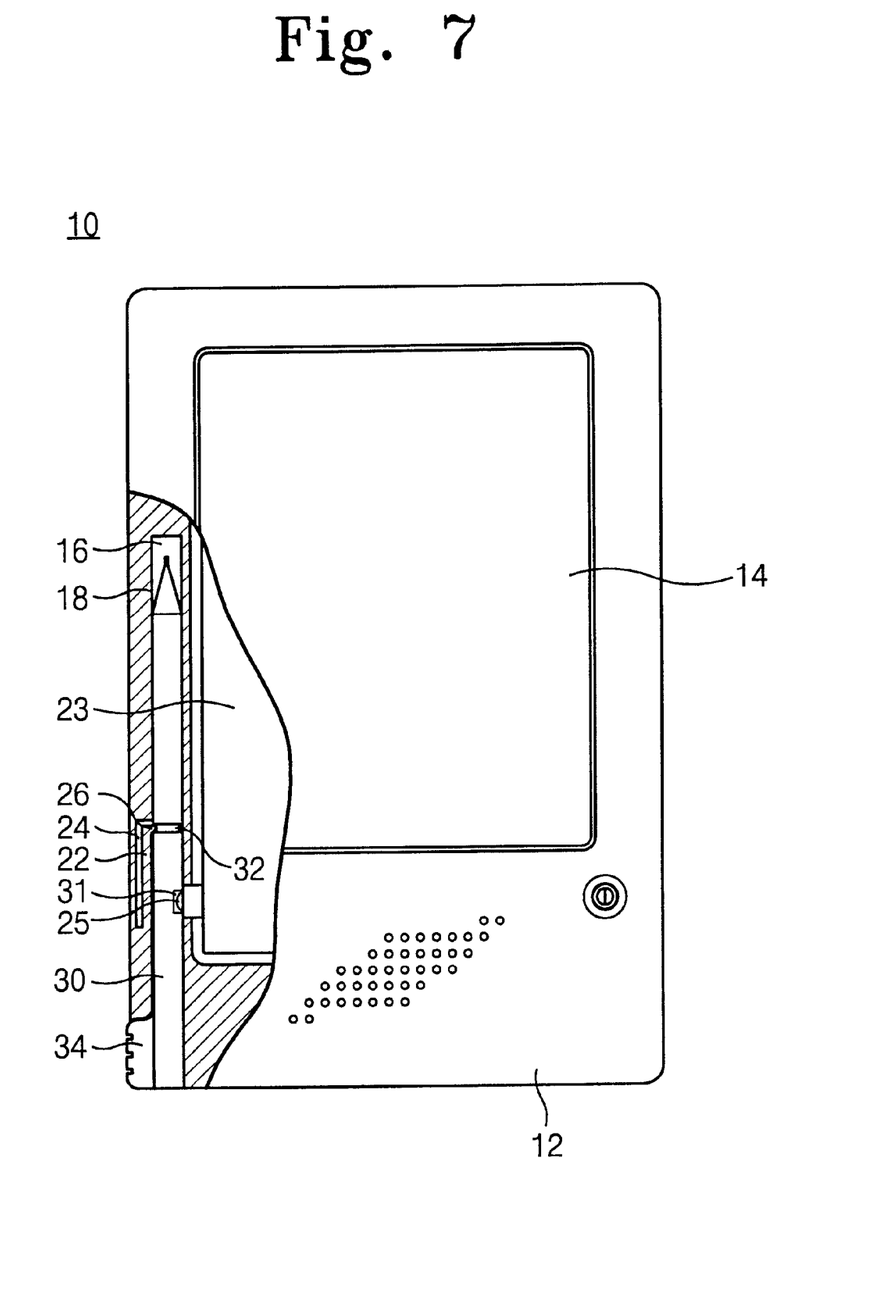
FIG. 7 is a partially cutaway plan view showing a stylus inserted into the stylus-holding means of a portable computer in the second embodiment.

Referring now to FIGS. 5 to 7, which show a portable computer according to a second embodiment of the present invention, it is seen that a portion of the push button switch 25 projects toward the central axis of stylus-holding hole 16 near which a locking member is positioned. The locking member consists of a resilient tongue 22 and a locking projection 26. The resilient tongue 22 is defined by a cut 24 in the sidewall 18 of stylus-holding hole 16, so as to be moved resiliently. One narrow side of the tongue 22 is connected integrally to the sidewall 18 and the other side is separated from the sidewall 18. Locking projection 26 is formed linearly on the end portion of the free end of resilient tongue 22, which is projected toward the central axis of stylus-holding hole 16.

Furthermore, an annular groove 32 is formed around the external surface of stylus 30. In accordance with this construction, when the stylus 30 is put into the stylus-holding hole 16, locking projection 26 and annular groove 32 are engaged with each other, thereby locking stylus 30 within stylus-holding hole 16. This construction keeps stylus 30 in place in stylus-holding hole 16.

A push button switch 25 is mounted on a printed circuit board 23 with a portion of the push button switch 25 projecting toward the central axis of the stylus-holding hole 16. Stylus 30 is provided with a recess 31. This construction causes stylus 30, when it is put into stylus-holding hole 16, to turn on switch 25, and the projecting portion of push button switch 25 is pushed by the external surface of stylus 30 until the projecting portion of push button switch 25 enters recess 31. When push button switch 25 is pushed, it generates a signal and thereby changes the power mode of the portable computer 10.

Referring now to FIG. 7, the projecting portion of push button switch 25 is engaged with recess 31 when locking projection 26 is engaged with annular groove 32. In order to remove stylus 30 from the stylus-holding hole 16, a user may push the stylus 30 out of the stylus-holding hole 16 while pressing its flange 34. At this time, locking projection 26 is extracted from the stylus-holding hole 16 while being pushed resiliently. Thus, when the stylus 30 is put into and taken out of the stylus-holding hole 16, power is turned off and on to the portable computer 10.

Referring to FIGS. 8 to 11, a portable computer 40 of a third embodiment of the present invention includes a top housing 50, a bottom housing 60, a frame 70, a board 71, a stylus 90, and a display (not shown). The top housing 50 and the bottom housing 60 are engaged with one other. Top housing 50 has a top face and four side faces; its bottom is open. Bottom housing 60, as shown here, engages with top housing 50 so as to cover the bottom of top housing 50. (Of course, the housing used for the portable computer 40 may have various alternative constructions.) Frame 70 is positioned in an internal space defined by the top and bottom housings 50 and 60, respectively. The frame 70 is connected to board 71, to which are mounted a power unit and electronic units for performing the various functions of the portable computer. The display is constructed to allow the stylus 90 to input data into the computer via the display. The screen of the display is positioned within the opening 56 of top housing 50.

Figure 8:
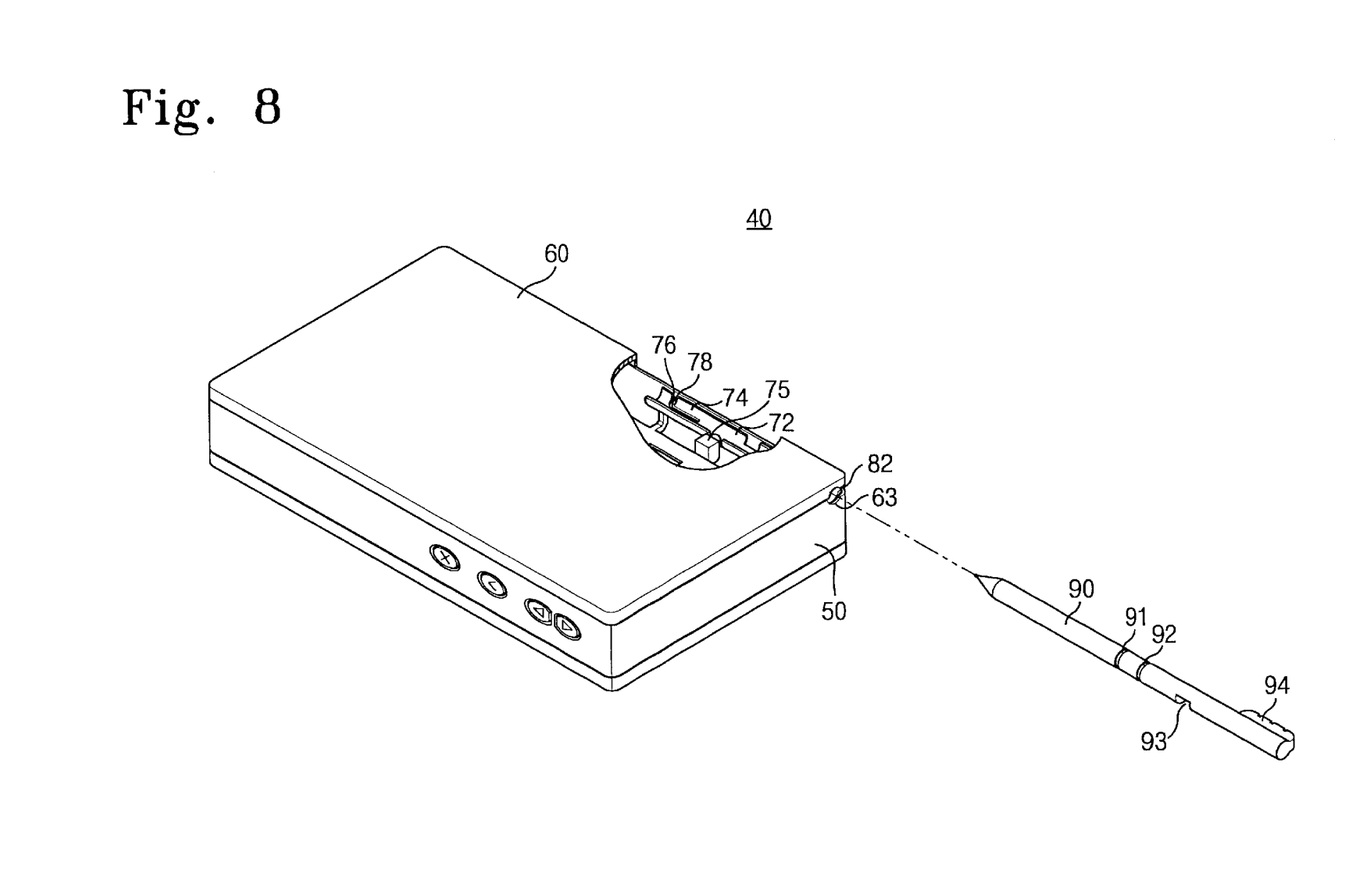
FIG. 8 is a partially cutaway perspective view showing a portable computer of a third embodiment of the present invention.
Figure 9:
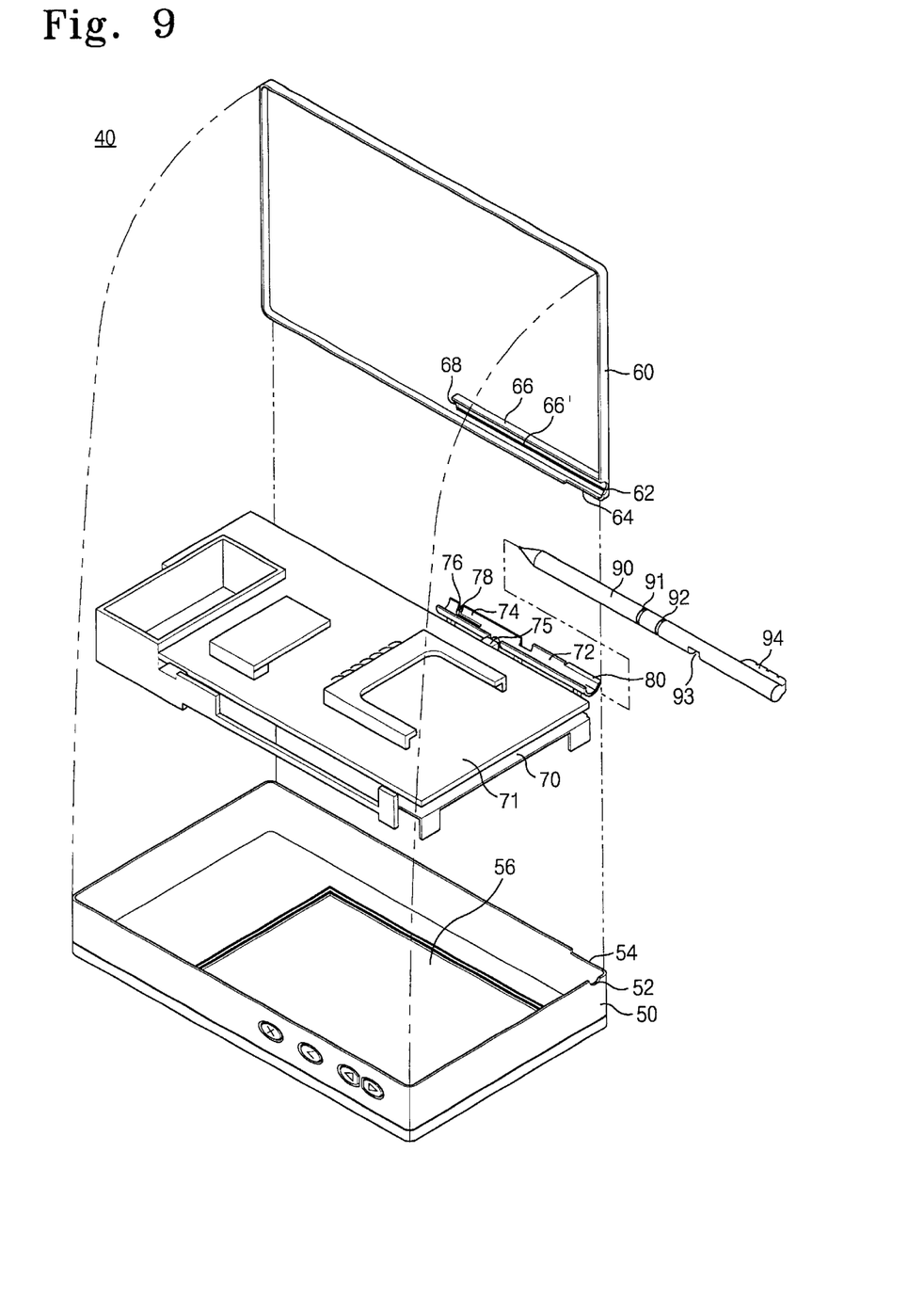
FIG. 9 is an exploded view showing the portable computer of FIG. 8.

Stylus 90 is positioned in the internal space defined by top housing 50 and bottom housing 60. A first notch 52 and a second notch 62 are respectively formed on the bottom end portion of a sidewall of top housing 50 and the top end portion of a sidewall of bottom housing 60. When top and bottom housings 50 and 60 are engaged with one other, first and second notches 52 and 62 form an opening 63 as is shown in FIG. 8. Stylus 90 is inserted through opening 63 into the internal space defined by top and bottom housings 50 and 60. The shape of opening 63 corresponds to the contour of the cross section of the stylus 90. Therefore, the shapes of first and second notches 52 and 62, respectively, are two half-contours of the cross section of stylus 90. A conventional means (e.g., a detent) for holding stylus 90, when it is inserted into the internal space, is formed in frame 70 and/or bottom housing 60. The holding means may be formed in frame 70, or in top housing 50 and the frame 70. The mounting position of the holding means is determined depending upon the desired portion in the internal space of the housing 50, 60. In this embodiment, as shown here, the holding means is a holding trough 72 formed in frame 70 and ribs 66, 66' and 68 (FIG. 9) formed in bottom housing 60. Holding trough 72 is partially cylindrical-shell-shaped, and its cross-sectional shape corresponds to that of first notch 52 and a half-contour of the cross section of stylus 90. Additionally, holding trough 72 is extended to such a length that it sustains the length of stylus 90. A resilient portion 74, a cut 76, and a projection 78 are formed in holding trough 72. Resilient portion 74 is defined by cut 76 to have a free end. Since resilient portion 74 has a free end, the resilient portion 74 can be resiliently moved forward and rearward. Projection 78 is so formed on the free end of resilient portion 74 as to be engaged with an annular groove 91 formed on the external surface of stylus 90. When the stylus 90 is put into the stylus-holding means, projection 78 locks the stylus 90 in place. By means of projection 78, stylus 90 is kept in the stylus-holding means. When holding the stylus 90 in the stylus-holding means, the holding trough 72 sustains one side of the stylus 90. The other side of the stylus 90 can be sustained by first ribs 66 and 66' and by second rib 68 formed in bottom housing 60. The first ribs 66 and 66' extend along a direction through which the stylus 90 is inserted. When top housing 50 is engaged with bottom housing 60 and stylus 90 is inserted into the stylus-holding means, the first ribs 66 and 66' together with holding trough 72 sustain the stylus 90, as is shown in FIGS. 8 and 9. Second rib 68 extends to connect the internal ends of the ribs 66 and 66' to each other. The second rib 68 is provided with a notch whose shape corresponds to the contour of the cross section of stylus 90. When the stylus 90 is put into the stylus-holding means, the second rib 68 sustains stylus 90 on the side opposite to holding trough 72. A first depression 54, a second depression 64, and a third depression 80 are respectively formed on top housing 50, bottom housing 60, and frame 70 at a corner of the housing. When top housing 50, bottom housing 60, and frame 70 are assembled into a main body, first, second, and third depressions 54, 64, and 80 form a slot 82, as seen in FIG. 8. A flange 94 of stylus 90 maybe inserted into slot 82 with a portion of the flange 94 projecting out of the housing. The slot 82 and the flange 94 facilitate the insertion of stylus 90 into the housing and the extraction of stylus 90 from the housing. A push button switch 75 is mounted on board 71; a portion of switch 75 projects into a valley defined by holding trough 72 so as to be pushed by the stylus 90 and thus generate a signal when the stylus 90 is inserted into the housing or is separated therefrom.

Figure 10:
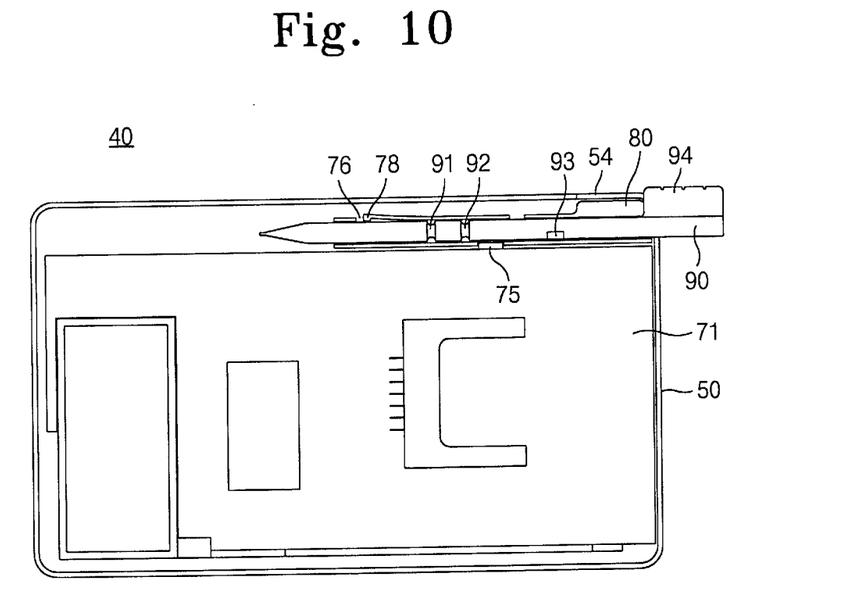
FIG. 10 is a plan views showing a stylus being put into a stylus-holding means of the portable computer in the third embodiment.
Figure 11:
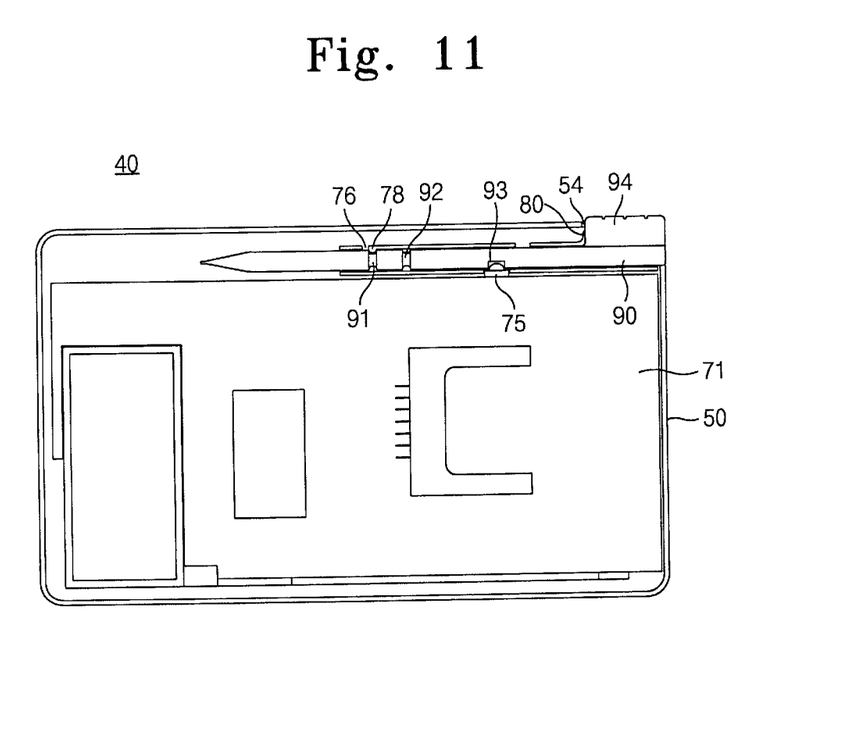
FIG. 11 is a plan view showing a further aspect of a stylus being put into a stylus-holding means of the portable computer in the third embodiment.

FIGS. 10 and 11 illustrate a process in which the stylus 90 is put into the stylus-holding means. A first annular groove 91, a second annular groove 92, and a recess 93 are formed on the external surface of stylus 90, in that order. Although first and second annular grooves 91 and 92 are formed ahead of recess 93, the sizes of the first and second annular grooves 91 and 92 are small. Hence, first and second annular grooves 91 and 92 do not cause the pushed projected portion of push button switch 75 to move while the pushed projected portion passes first and second annular grooves 91 and 92; hence, the pushed projected portion continues to be pushed. However, when stylus 90 has been inserted to a position where the pushed projected portion is exactly over recess 93, the pushed projected portion is restored because the recess 93 has sufficient space to receive the pushed projected portion. Recess 93 may be positioned ahead of first and second grooves 91 and 92. Since the operation of this embodiment, in which power supply is controlled while the stylus 90 is inserted into the stylus-holding means, is comparable to the first and second embodiments, detailed description of the operation is omitted here.

As described above, the present invention provides a portable computer that prevents a stylus from being lost, protects a display from being damaged, and eliminates inconvenience in operating the computer.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. A portable computer comprising a power supply and a stylus-holder adapted for holding a stylus, said computer being adapted for receiving input of data by means of the stylus, said portable computer further comprising:

sensor means for detecting insertion of the stylus into the stylus-holder, thereby generating an IN signal, and for detecting extraction of the stylus from the stylus-holder, thereby generating an OUT signal; and power control means coupled to the sensor means and responsive to said IN and OUT signals of said sensor means, said power control means determining whether said portable computer is in an operating mode or a non-operating mode, and said power control means placing said portable computer into a first power mode in response to the IN signal when said portable computer is in the operating mode and placing said portable computer into a second power mode in response to the OUT signal;

when said portable computer is in the non-operating mode.

2. The computer of claim 1, wherein the first power mode is at least one of OFF and STANDBY, and the second power mode is ON.

3. The computer of claim 1, wherein the sensor means is a push button switch activated by motion of the stylus.

4. The portable computer of claim 1, further comprising locking means for locking said stylus in place in said stylus-holder once said stylus is fully inserted into said stylus-holder, and wherein said locking means comprises a resilient tongue defined by a cut in a sidewall of said stylus-holder, and an annular groove formed around an external surface of said stylus, said resilient tongue and said annular groove become engaged with each other when said stylus is fully inserted into said stylus-holder.

5. The portable computer of claim 4, said locking means further comprising a locking projection formed linearly on an end portion of a free end of said resilient tongue for engaging said annular groove.

6. The portable computer of claim 5, wherein said stylus has at least one additional annular groove formed on said external surface thereof ahead of said annular groove so that said at least one additional groove passes said locking projection prior to said annular groove engaging said locking projection.

7. The portable computer of claim 1, wherein a flange is formed on an exterior surface of said stylus and a slot is formed on an interior surface of said stylus-holder, said flange and said slot having respective shapes which are complementary, and wherein a user presses an said flange to remove said stylus from said stylus-holder.

8. The portable computer of claim 1, further comprising locking means for locking said stylus in place in said stylus-holder once said stylus is fully inserted into said stylus-holder, and wherein said portable computer comprises a top housing and a bottom housing, said stylus-holder comprising a holding trough disposed between said top and bottom housings and said locking means comprising a plurality of ribs formed in said bottom housing for retaining said stylus in place when said stylus is inserted into said stylus-holder.

9. The portable computer of claim 1, further comprising locking means for locking said stylus in place in said stylus-holder once said stylus is fully inserted into said stylus-holder, and wherein said portable computer comprises a top housing and a bottom housing, said stylus-holder comprising a holding trough disposed between said top and bottom housings, and said locking means comprising a projection formed on said holding trough and an annular groove formed on an exterior surface of said stylus, said projection becoming engaged with said annular groove when said stylus is inserted into said stylus-holder.

10. The portable computer of claim 9, said locking means further comprising a resilient portion and a cut formed in said holding trough, said resilient portion being defined by said cut to have a free end so that said resilient portion moves backward and forward resiliently, said projection being formed on said free end of said resilient portion.

11. A method of changing a power supply of a portable computer from a first mode to a second mode and vice-versa, said portable computer comprising a stylus-holder adapted for holding a stylus, said portable computer being adapted for receiving input of data by means of the stylus, said method comprising:

determining whether the portable computer is in an operating mode or in a non-operating mode;

generating an IN signal by inserting the stylus into the stylus-holder and generating an OUT signal by extracting the stylus from the stylus-holder; and     when the portable computer is in the operating mode, determining whether the stylus is being held by the stylus-holder;

automatically placing the portable computer into a first power mode when the portable computer is in the operating mode and the stylus is being held by the stylus-holder;

when the portable computer is in the non-operating mode, determining whether the stylus is out of the stylus-holder; and     automatically placing the portable computer into a second power mode when the portable computer is in the non-operating mode and the stylus is out of the stylus-holder.

12. The method of claim 11, wherein the first power mode is at least one of OFF and STANDBY, and the second power mode is ON.

13. A stylus-holder for a portable computer, said stylus-holder comprising:

a receptacle for receiving and holding the stylus; and locking means for locking said stylus in place in said receptacle once said stylus is fully inserted into said receptacles;

wherein said locking means comprises a resilient tongue defined by a cut in a sidewall of said stylus-holder, and an annular groove formed around an external surface of said stylus, said resilient tongue and said annular groove become engaged with each other when said stylus is fully inserted into said stvlus-holder.

14. The stylus-holder of claim 13, said locking means further comprising a locking projection formed linearly on an end portion of a free end of said resilient tongue for engaging said annular groove.

15. The stylus-holder of claim 14, wherein said stylus has at least one additional annular groove formed on said external surface thereof ahead of said annular groove so that said at least one additional groove passes said locking projection prior to said annular groove engaging said locking projection.

16. A stylus-holder for a portable computer, said stylus-holder comprising:

a receptacle for receiving and holding the stylus; and locking means for locking said stylus in place in said receptacle once said stylus is fully inserted into said receptacle;

wherein a flange is formed on an exterior surface of said stylus and a slot is formed on an interior surface of said stylus-holder, said flange and said slot having respective shapes which are complementary, and wherein a user presses an said flange to remove said stylus from said stylus-holder.

17. A stylus-holder for a portable computer, said stylus-holder comprising:

a receptacle for receiving and holding the stylus; and locking means for locking said stylus in place in said receptacle once said stylus is fully inserted into said receptacle;

wherein said portable computer comprises a top housing and a bottom housing, said stylus-holder comprising a holding trough disposed between said top and bottom housings and said locking means comprising a plurality of ribs formed in said bottom housing for retaining said stylus in place when said stylus is inserted into said stylus-holder.

18. A stylus-holder for a portable computer, said stylus-holder comprising:

a receptacle for receiving and holding the stylus; and locking means for locking said stylus in place in said receptacle once said stylus is fully inserted into said receptacle;

wherein said portable computer comprises a top housing and a bottom housing, said stylus-holder comprising a holding trough disposed between said top and bottom housings, and said locking means comprising a projection formed on said holding trough and an annular groove formed on an exterior surface of said stylus, said projection becoming engaged with said annular groove when said stylus is inserted into said stylus-holder.

19. The stylus-holder of claim 18, said locking means further comprising a resilient portion and a cut formed in said holding trough, said resilient portion being defined by said cut to have a free end so that said resilient portion moves backward and forward resiliently, said projection being formed on said free end of said resilient portion.

20. A portable computer, comprising:

a stylus-holder adapted for holding a stylus, said portable computer being adapted for receiving input of data by means of the stylus;

determining means for determining whether the portable computer is in an operating mode or in a non-operating mode; and generating means for generating an IN signal when the stylus is inserted into the stylus-holder and for generating an OUT signal when the stylus is withdrawn from the stylus-holder;

wherein, when the portable computer is in the operating mode, said determining means determines whether the stylus is being held by the stylus-holder, and automatically places the portable computer into a first power mode when the portable computer is in the operating mode and the stylus is being held by the stylus-holder; and wherein, when the portable computer is in the non-operating mode, said determining means determines whether the stylus is out of the stylus-holder, and automatically places the portable computer into a second power mode when the portable computer is in the non-operating mode and the stylus is out of the stylus-holder.

21. The portable computer of claim 20, wherein the first power mode is at least one of OFF and STANDBY, and the second power mode is ON.

* * * * *

UNITED STATES PATENT AND TRADEMARK OFFICE
CERTIFICATE OF CORRECTION

PATENT NO. : 6,681,333 B1
DATED : January 20, 2004
INVENTOR(S) : Young-Tack Cho It is certified that error appears in the above-identified patent and that said Letters Patent is hereby corrected as shown below:

Column 6,
Line 51, should read: -- OUT signal when said portable computer is in the non-operating made. --

Signed and Sealed this

Fourth Day of May, 2004

JON W. DUDAS
*Acting Director of the United States Patent and Trademark Office*